(12) United States Patent
Reitze

(10) Patent No.: US 6,443,523 B1
(45) Date of Patent: Sep. 3, 2002

(54) CAR SEAT WITH A HANGER ELEMENT FOR CLOTHING ARTICLES

(75) Inventor: Achim Reitze, Kassel (DE)

(73) Assignee: Faurecia Autositze GmbH & Co. KG, Stadthagen (DE)

( * ) Notice: Subject to any disclaimer, the term of this patent is extended or adjusted under 35 U.S.C. 154(b) by 0 days.

(21) Appl. No.: 09/715,185

(22) Filed: Nov. 20, 2000

(30) Foreign Application Priority Data

Nov. 20, 1999 (DE) ..................... 299 20 466 U

(51) Int. Cl.⁷ ................................. A47C 7/62
(52) U.S. Cl. ................ 297/188.03; 297/188.05
(58) Field of Search ............. 297/188.03, 188.04, 297/188.05, 188.21

(56) References Cited

U.S. PATENT DOCUMENTS

| | | | | |
|---|---|---|---|---|
| 2,262,581 A | * | 11/1941 | Gonczy ................. | 297/188.03 |
| 3,100,128 A | * | 8/1963 | Gleitsman et al. ...... | 297/188.03 |
| 3,149,879 A | * | 9/1964 | Steiber .................. | 297/188.03 |
| 4,711,488 A | * | 12/1987 | Ohanessian ............ | 297/188.03 |
| 4,957,230 A | * | 9/1990 | Gonzales ........... | 297/188.03 X |

FOREIGN PATENT DOCUMENTS

| | | | | |
|---|---|---|---|---|
| DE | 90585 | * | 2/1897 | ............ 297/188.05 |
| DE | 3637 582 A1 | | 5/1988 | |
| FR | 2 762 560 | | 4/1997 | |

* cited by examiner

Primary Examiner—Laurie K. Cranmer
(74) Attorney, Agent, or Firm—Connolly Bove Lodge Hutz, LLP

(57) ABSTRACT

A car seat is disclosed having a seat part and a back support, on which a hanger element is mounted for hanging articles of clothing. When not being used, the hanger element is stored in a recessed position that is flush with the back support. For use, a hanger element bow can be moved and guided to a parallel usage position at some distance from its recessed position.

4 Claims, 1 Drawing Sheet

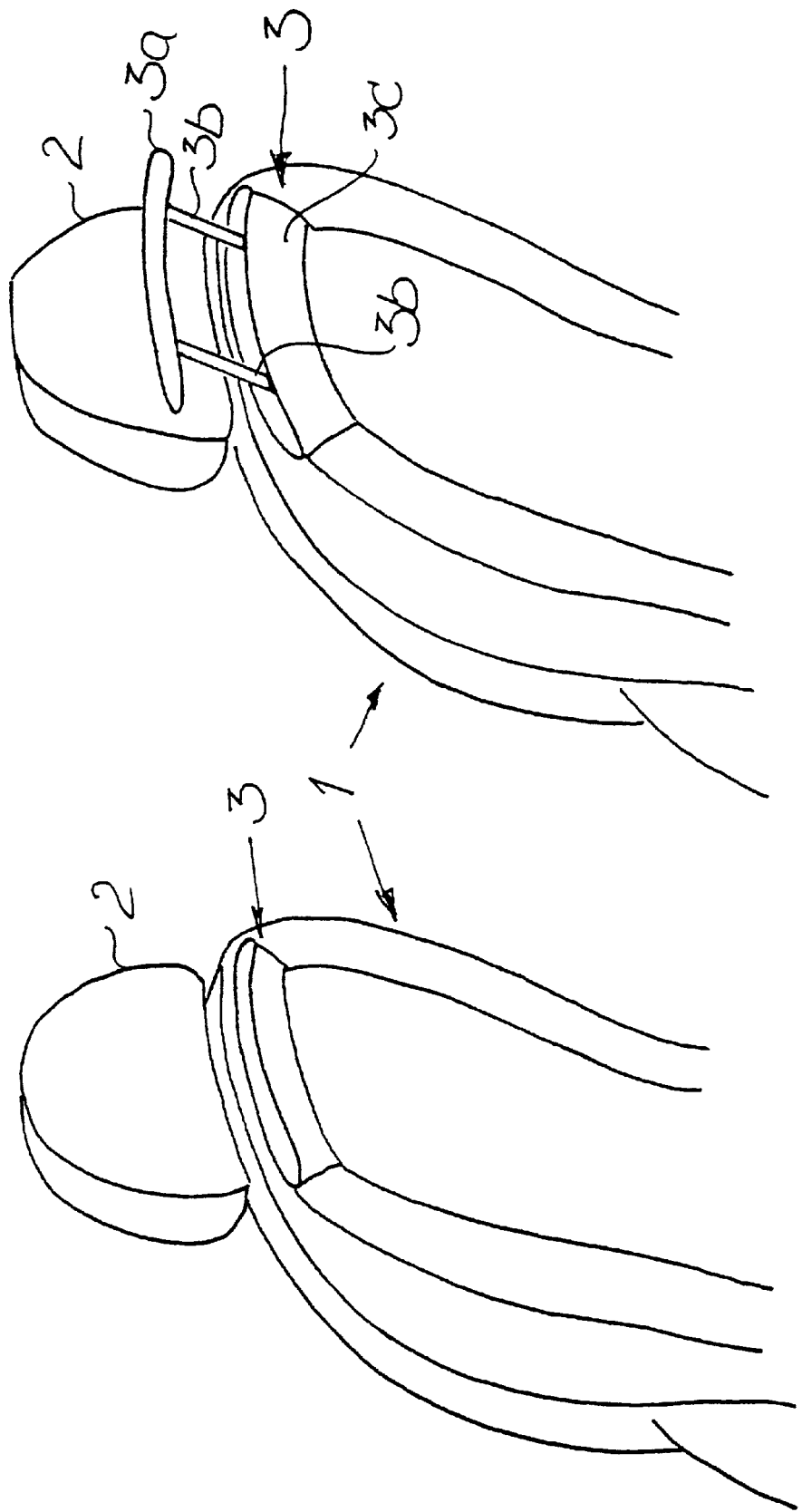

CAR SEAT WITH A HANGER ELEMENT FOR CLOTHING ARTICLES

FIELD OF THE INVENTION

The invention relates to a car seat having a seat part and a back support, on which a hanger element is mounted for hanging articles of clothing. When not being used, the hanger element is stored in a recessed position that is flush with the back support. For use, a hanger element bow can be moved and guided to a parallel usage position at some distance from its recessed position.

BACKGROUND OF THE INVENTION

According to a car seat of the known type (DE 36 37 582 A1), a bow-shaped hanger element is jointed to the rear wall of the backrest so that it can be rotated around a horizontal axis. During the status when the element is not used, the upper edge part of the hanger element, which is referred to as al tongue, can be brought into a retracted position in which the tongue part is flush with the rear wall. The collapsible linking part of the tongue-shaped hanging element makes it necessary to extent the hanging element to a relatively large extent in the lengthwise direction of the seat. The disadvantage of this is that the hanger element results in an esthetically displeasing view of the back of the backrest even when it is in the folded-in status.

According to another known car seat (FR 2 762 560 A1), a carrier is attached to the backrest, on which a plate-shaped hanger element is supported so that it can be rotated around a horizontal axis. In a first horizontal swivel position, the hanger element serves as a table plate, in a second swivel position in which it is directed vertically upward, it serves as a hanger for clothing articles. The hanger element can be folded when it is in the unused status in a downward position, which runs parallel to the rear wall of the back support. The hanger element, however, is a disturbing element for passengers sitting behind it in every possible swivel position.

SUMMARY OF THE INVENTION

Based on the above described status of technology mentioned above, the purpose of this invention is to construct a car seat according to known prior art in such a way so that the visible region of a hanger element can be formed small in the unused status, while the hanger element is at the same time also easily accessible during the used status.

The solution of this task is accomplished in accordance with the characteristics disclosed in patent claim 1.

Only a small area of the hanger element is visible in the unused position, namely the upper edge area of the bow-shaped hanger element on which articles of clothing will be hanged. The hanger element can be pulled out for use so far from the back support so that it can accommodate also larger articles of clothing.

Preferred embodiments of this invention will become clear from a description of the subordinated claims.

BRIEF DESCRIPTION OF THE DRAWINGS

The drawings indicate:

FIG. 1—a perspective view of the back support with an inclination from the lower part, wherein the hanger element is in the unused position;

FIG. 2—a perspective view of the back support according to FIG. 1, wherein the hanger element is in the used position.

DETAILED DESCRIPTION OF THE INVENTION

A preferred embodiment of the invention is now described with reference to FIGS. 1 and 2. Back support 1, which supports a headrest 2, is provided in its upper region with a hanger element 3. The hanger element 3 comprises essentially an approximately horizontal bow 3a, which is connected with two parallel and essentially vertical extraction rods 3b. The extraction rods 3b are introduced into the corresponding receiving parts in the back support 1, which are designed for adjustable length.

The hanger is pulled out in the upward direction with inclined at an angle. The result of this is that the bow 3a will be, in the extracted status, removed from the back support 1 not only in the vertical direction, but also in the horizontal direction. This ensures that bow 3a will be particularly well accessible.

As one can see from FIG. 1, bow 3a is, in the unused status, pushed so far in the downward direction that only its upper edge will be visible.

Because in the usage position, which is depicted in FIG. 2, a clearly specified distance measured in the horizontal direction is maintained between bow 3a and back support 1 and headrest 2, this makes it possible to hang, without any problems, several articles of clothing on top of each other on bow 3a, if this is necessary.

Because the extraction rods 3b can be locked in different extraction position, the result is that bow 3a can be fixed in different height positions. The fixing mechanism can be constructed also as a catch.

The hanger element comprises, on the one hand, bow 3a which is provided with extraction rods 3b, formed in the vertical direction from the hanger element and, on the other hand, a leaning-resistant lower part 3c, which contains the mechanism required for the introduction and locking of the extraction rods 3b.

What is claimed is:

1. A car seat having a seat part and a back support (1), on which a hanger element (3) is mounted flush with a profile of the back support (1), wherein the hanger element (3) includes a bow (3a) that with an upper surface that is flush with the profile of the back support and the hanger element in a recessed position, and extendable in a parallel usage position at a variable locked distance from the back support by a pair of extraction rods that extend from the hanger element and lock in different extension positions.

2. The car seat according to claim 1, wherein the extraction rods (3b), which are attached to the bow (3a), extend in a lengthwise direction of the hanger element (3) through engagement with a leaning-resistant extraction guiding lower part that contains a mechanism for locking the pair of extension rods.

3. The car seat according to claim 2, wherein the extraction rods (3b) and extraction guiding devices are extended in an upward direction and deployed opposite a rear side surface of the back support (1) so that the extraction rods (3b) and extraction guiding devices are tilted at a pointed angle having an apex in a lower part of the back support.

4. The car seat according to claim 2, wherein the extraction rods (3b) are frictionally engaged by the extraction guiding lower part of the hanger element.

* * * * *